United States Patent
Goren et al.

(10) Patent No.: US 12,147,868 B2
(45) Date of Patent: Nov. 19, 2024

(54) LONG-RANGE ENGINE WITH TWO CAMERAS HAVING DIFFERENT RESOLUTION

(71) Applicant: ZEBRA TECHNOLOGIES CORPORATION, Lincolnshire, IL (US)

(72) Inventors: David P. Goren, Smithtown, NY (US); Harry E. Kuchenbrod, Kings Park, NY (US); William Sackett, East Setauket, NY (US); Vladimir Gurevich, Great Neck, NY (US); Mehaboob Kumbalakkuzhiyil, Holbrook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 12 days.

(21) Appl. No.: 17/977,352

(22) Filed: Oct. 31, 2022

(65) Prior Publication Data
US 2024/0143955 A1 May 2, 2024

(51) Int. Cl.
*G06K 7/10* (2006.01)
*G06K 7/14* (2006.01)

(52) U.S. Cl.
CPC ..... *G06K 7/10722* (2013.01); *G06K 7/10831* (2013.01); *G06K 7/1093* (2013.01); *G06K 7/146* (2013.01)

(58) Field of Classification Search
CPC .......... G06K 7/10722; G06K 7/10831; G06K 7/1093; G06K 7/146
See application file for complete search history.

(56) References Cited

U.S. PATENT DOCUMENTS

| | | | |
|---|---|---|---|
| 9,185,306 B1* | 11/2015 | Tan | G06K 7/10811 |
| 10,452,885 B1* | 10/2019 | Kuchenbrod | G06K 7/10722 |
| 11,451,716 B2* | 9/2022 | Germaine | G06K 7/10801 |
| 2015/0326801 A1 | 11/2015 | Seshadrinathan et al. | |
| 2015/0358560 A1 | 12/2015 | Boulanger et al. | |
| 2019/0188513 A1* | 6/2019 | Beghtol | G07G 1/0045 |
| 2022/0166936 A1 | 5/2022 | Kim et al. | |

OTHER PUBLICATIONS

International Search Report and Written Opinion for International Application No. PCT/US2023/36094 mailed on Jan. 22, 2024.

* cited by examiner

*Primary Examiner* — Seung H Lee
(74) *Attorney, Agent, or Firm* — Yuri Astvatsaturov

(57) ABSTRACT

Devices having a long-range imaging engine formed of two cameras having different resolution are disclosed herein. An example imaging engine includes a front-end, with the cameras, terminated in a communication interface for coupling to an external host processor that performs image processor. The front-end has a near field image sensor and a far field image sensor, and a normalization processor to receive the respective image data from the sensors and normalize that image data prior to sending to the host processor. Normalization includes adjusting an image size, aspect ratio, or pixel count complying with data rate constraints imposed by the communication interface or the host processor.

30 Claims, 6 Drawing Sheets

LONG-RANGE ENGINE WITH TWO CAMERAS HAVING DIFFERENT RESOLUTION

BACKGROUND

Industrial scanners and/or barcode readers may be used in warehouse environments and/or other environments and may be provided in the form of fixed, mountable, or mobile scanning devices, for example. These scanners may be used to scan barcodes and other objects. Scanners are frequently used in environments that involve scanning or resolving barcodes across a wide range of distances, such as from inches to tens of feet, or more, may be desirable.

Such industrial scanners may be implemented, in various examples, including using imagers such as camera systems. Further, to scan over a range of distances, some have developed scanners that include multiple camera systems, each having different scanning ranges. These camera systems may include different image sensors that each have different resolutions. For example, a near range camera can have a 1 megapixel (MP) image sensor (1280×800) and a far range camera can have a 2MP sensor (1920×1080). With such multiple imager sensor configurations, when sending captured images from the various imager sensors to a host processor for decoding (e.g., decoding at a mobile terminal), the host processor needs to dynamically receive images of different sizes/resolutions and then process those images for barcode decoding or other imaging. This process is particularly difficult when the host processor does not know ahead of time which image size it will be receiving. The host processor would need to be dynamically re-programmed for different image sizes, which would result in lost frames and longer decode times.

There is a need for multiple-camera scanners that are able to efficiently enable host processors to dynamically acquire images from the multiple cameras and at different resolutions, in a manner that allows for efficient imaging processing and decoding at the host processor.

SUMMARY

In an embodiment, the present invention is a method for providing host processor processing of image data from imaging sensors, the method comprising: capturing image data of a near field of view of an environment using one of the imaging sensors, the image data of the near field of view being captured at a first image size; capturing image data of a far field of view of the environment from another of the imaging sensors, the image data of the far field of view being captured at a second image size different that the first image size; communicating the captured image data of the near field of view and the captured image data of the far field view to a normalization processor; at the normalization processor, performing an image normalization process on at least one of the captured image data of the near field of view and the captured image data of the far field view to normalize at least one of the first image size and the second image size prior to communicating at least one of the captured image data of the near field of view and the captured image data of the far field view to an external host processor coupled to the normalization processor through a communication interface; and at the host processor, performing an image processing on at least one of the captured image data of the near field of view and the captured image data of the far field view.

In a variation of this embodiment, the first image size is smaller than the second image size, and performing the image normalization process on at least one of the captured image data of the near field of view and the captured image data of the far field view comprises: applying a padding process to the captured image data of the near field of view to increase the first image size to equal that of the second image size In a variation of this embodiment, the first image size is smaller than the second image size, and performing the image normalization process on at least one of the captured image data of the near field of view and the captured image data of the far field view comprises: applying a cropping process to the captured image data of the far field of view to decrease the second image size to equal that of the first image size In a variation of this embodiment, the first image size is smaller than the second image size, and performing the image normalization process on at least one of the captured image data of the near field of view and the captured image data of the far field view comprises: applying a binning process to the captured image data of the far field of view to decrease the second image size to equal that of the first image size In a variation of this embodiment, wherein the first image size is smaller than the second image size, and performing the image normalization process on at least one of the captured image data of the near field of view and the captured image data of the far field view comprises: applying a scaling process to the captured image data of the far field of view to decrease the second image size to equal that of the first image size In a variation of this embodiment, wherein the first image size is smaller than the second image size, and performing the image normalization process on at least one of the captured image data of the near field of view and the captured image data of the far field view comprises: altering an aspect ratio of one or both of the captured image data of the far field of view and the captured image data of the near field of view so that the second image size is equal that of the first image size In a variation of this embodiment, performing the image normalization process comprises: reducing a number of active rows in one or both of the captured image data of the far field of view and the captured image data of the near field of view so that the second image size is equal that of the first image size In a variation of this embodiment, performing the image normalization process results in an equal number of pixels in the first image size and the second image size.

In a variation of this embodiment, performing the image normalization process comprises: altering the first image size and/or the second image size until the captured image data of the near field of view and the captured image data of the far field view are sent from the normalization processor to the host processor at substantially the same frame rate In a variation of this embodiment, substantially the same frame rate comprises a frame rate of the captured image data of the near field of view within +/−10% of a frame rate of the captured image data of the far field view.

In a variation of this embodiment, performing the image normalization process comprises: altering a frame rate of the image data of the near field of view and/or a frame rate of the image data of the far field of view before communicating to the host processor.

In a variation of this embodiment, the method further comprises adding tag data one or both of the captured image data of the far field of view and the captured image data of the near field of view, the tag data indicating a type of the image normalization process or a source imaging sensor for the one or both of the first image data and the second image data.

In a variation of this embodiment, performing the image processing comprises decoding a decodable indicia in at least one of the captured image data of the near field of view and the captured image data of the far field view.

In a variation of this embodiment, wherein a near field image sensor captures the image data of the near field of view and a far field image sensor captures the image data of the far field of view, and wherein the near field image sensor and the far field image sensor are coupled to the normalization processor by respective data channels each having a same data throughput rate, and wherein the normalization processor is coupled to the host processor through a separate data channel having the same data throughput rate or a different data throughput rate.

In a variation of this embodiment, the near field image sensor and the far field image sensor are coupled to the normalization processor through a 1 channel, 2 channel or 4 channel MIPI data channel, respectively.

In a variation of this embodiment, the normalization processor is coupled to the host processor through a 2 channel or 4 channel MIPI data channel.

In another embodiment, the present invention is an image sensor comprising: a front-end terminated in a communication interface configured for communicating with an external host processor through the communication interface; the front-end comprising, an image sensor assembly comprising, a near field of view image sensor configured to capture a first image data at a first image size, and a far field of view image sensor configured to capture second image data at a second image size different than the first image size, and a normalization processor configured to receive the first image data and the second image data and further configured to perform an image normalization process on at least one of the first image data and the second image data to normalize at least one of the first image size and the second image to generate a normalized image data set for communicating to the host processor, the normalization processor coupled to communication interface.

In a variation of this embodiment, the image sensor further comprises the external host processor coupled to the communication interface, the host processor configured to performing an image processing on the normalized image data In a variation of this embodiment, the normalization processor is configured to: apply a padding process to the first image data to increase the first image size to equal that of the second image size.

In a variation of this embodiment, the normalization processor is configured to: apply a cropping process to the second image data to decrease the second image size to equal that of the first image size.

In a variation of this embodiment, the normalization processor is configured to: apply a binning process to the second image data to decrease the second image size to equal that of the first image size.

In a variation of this embodiment, the normalization processor is configured to: apply a scaling process to the second image data to decrease the second image size to equal that of the first image size In a variation of this embodiment, the normalization processor is configured to: alter an aspect ratio of one or both of the first image data and the second image data so that the second image size is equal that of the first image size In a variation of this embodiment, normalization processor is configured to: reduce a number of active rows in one or both of the first image data and the image data so that the second image size is equal that of the first image size.

In a variation of this embodiment, normalization processor is configured to: equalize a number of pixels in the first image size to a number of pixels in the second image size.

In a variation of this embodiment, normalization processor is configured to: alter the first image size and/or the second image size until the first image data and the second image data are to have substantially the same frame rate over the communication interface.

In a variation of this embodiment, where substantially the same frame rate comprises a frame rate of the first image data being within +/−10% of a frame rate of the second image data In a variation of this embodiment, wherein the normalization processor is configured to: alter a frame rate of the first image data and/or a frame rate of the second image data.

In a variation of this embodiment, the normalization processor is configured to: add tag data to one or both of the first image data and the second image data, the tag data indicating a type of the image normalization process or a source imaging sensor for the one or both of the first image data and the second image data.

In a variation of this embodiment, the near field of view image sensor being coupled to the normalization processor through a first data channel and the far field of view image sensor being coupled to the normalization processor through a second data channel, the first data channel and the second data channel having a same data throughput rate, and wherein the communication interface for communicating with the external host processor provides a separate data channel having the same data throughput rate as the first data channel and the second data channel or a different data throughput rate.

In a variation of this embodiment, the first data channel and the second data channel are each a 1 channel, 2 channel, or 4 channel MIPI data channel.

In a variation of this embodiment, the separate data channel provided by the communication interface is a 2 channel or 4 channel MIPI data channel.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
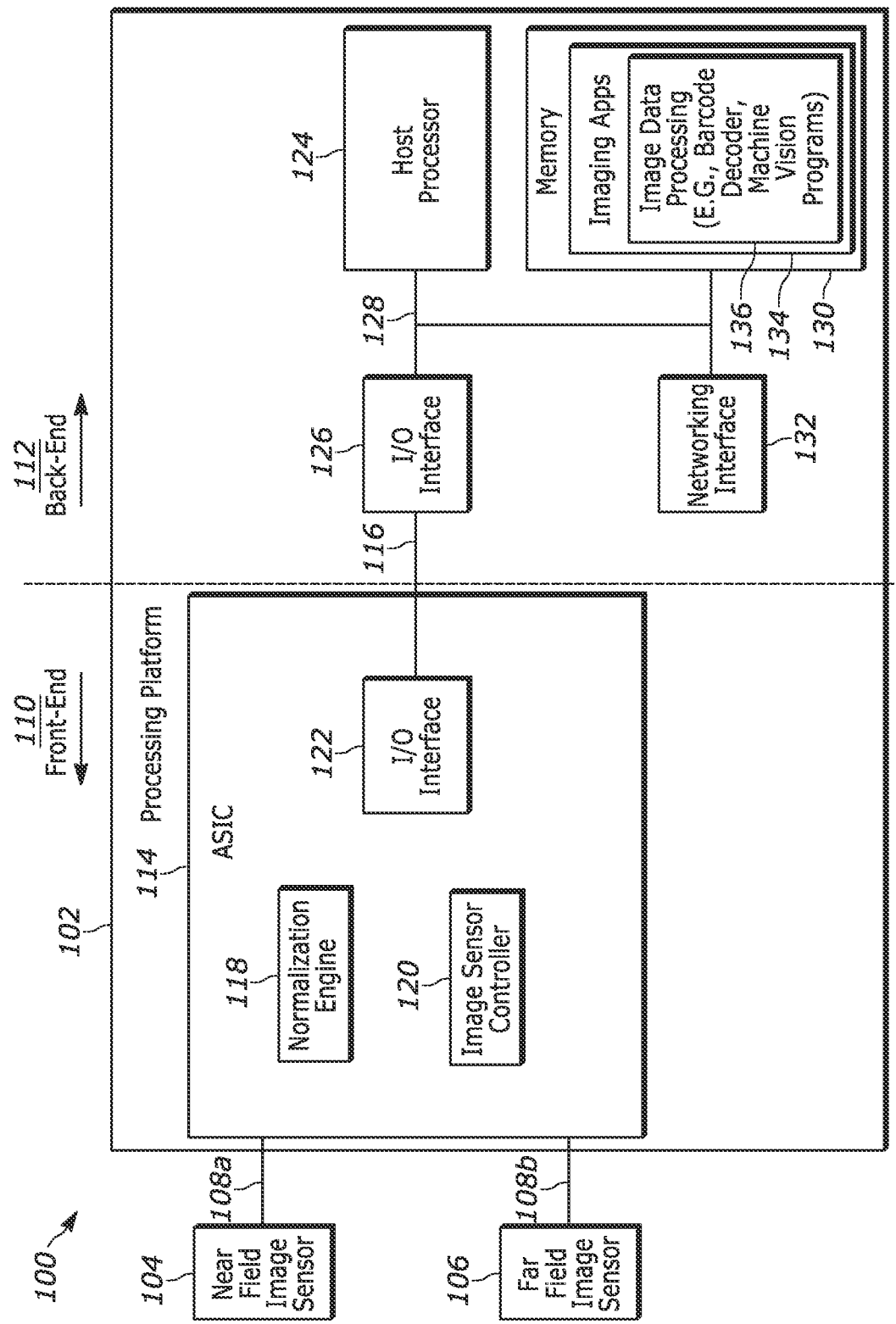
FIG. 1 illustrates a schematic of an example of an imaging device having a long-range imaging engine formed of two image sensors each having a different resolution and, in particular, showing a dedicated front-end ASIC and the back-end host processor, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventionally, industrial scanners may use multiple imagers to scan over a large range of distances, where each imager has a different scanning range. To allow for high resolution imaging, each imager may have an image sensor with a different resolution. For example, a near range imager may have a 1 megapixel (MP) image sensor (1280×800) and a far range imager may have a 2MP sensor (1920×1080). Conventionally, a host processor is used for identifying and decoding indicia (or other objects) in the images received from these image sensors. Yet, because the images can be from different sensors and have different sizes/resolutions, the host processor needs to dynamically receive images and resolve them prior to analysis. This process is particularly difficult when the host processor does not know ahead of time which image size it will be receiving. The result is that the host processor often loses frames, which are typically captured at very high frame rates, and that experiences longer decode times that desired.

Thus, it is an objective of the presentation application to eliminate these and other problems with conventional scanners by providing systems and methods to Thus, the present application provides for multiple-camera scanners that are able to efficiently enable host processors to dynamically acquire images from the multiple cameras and at different resolutions, in a manner that allows for efficient imaging processing and decoding at the host processor.

FIG. 1 is a block diagram of an imaging device 100 for having a multiple imagers of different resolutions for enabling efficient, dynamic operation of a host processor to process received images. In particular, FIG. 1 is a block diagram representative of an example logic circuit configuration for implementing an imaging device, in accordance with various examples herein. The imaging device 100 may be implemented in an example logic circuit capable of executing instructions to, for example, implement operations of the example methods described herein, as may be represented by the flowcharts of the drawings that accompany this description. While various examples are illustrated and described, it will be appreciated that example logic circuits capable of, for example, implementing operations of the example methods described herein may include field programmable gate arrays (FPGAs) and application specific integrated circuits (ASICs). Other example logic circuits include digital signal processors (DSPs), image signal processors (ISPs), and general-purpose CPUs.

The imaging device 100 includes a processing platform 102 coupled to two image sensors, a near field image sensor 104 and a far field image sensor 106, through respective data channels (e.g., communication buses) 108a and 108b. The processing platform 102 includes a processing front-end 110 and a processing back-end 112. In various examples, the processing front-end 110 is configured to control operation of the image sensors 104 and 106 to capture single or continuous images over respective fields of view (FOVs), where such images are captured, stored, and communicated as image data. The image data from the respective image sensors will be at different image resolutions, as discussed further herein. The front-end 110 may be configured to capture raw image data from the image sensors 104, 106, simultaneously or sequentially. The front-end 110 may be configured to capture image data in response to various triggers depending on the configuration, for example, in response to an external event, such as detection of an object entering a FOV of one of the image sensors, a user input, or through other initiating actions. Further, the front-end 110 configured to pre-process the captured image data and communicate it to the back-end 112, which is configured to identify features of interest in the image data. In particular, the front-end 110 is configured to perform a normalization process on captured image data prior to communicating that image data to the back-end 112 over a communication bus 116.

To affect such pre-processing, in the illustrated example of FIG. 1, the front-end 110 contains an ASIC 114 that includes a normalization engine 118, an image sensor controller 120, and an I/O interface 122 communicatively coupled to the communication bus 116. The back-end 112 includes a host processor 124 that receives the captured image data, such as affected image data from the ASIC 114, over an I/O interface 126, and performs dedicated imaging processing operations on that data, such as object identification, feature identification, indicia identification and decoding, or other processing-intensive operations isolated from the front-end 110, which is to provide a lightweight processing operations. In various examples, the host processor 124 may send control commands to the front-end 110, i.e., the ASIC 114, to control operation of the image sensors 104, 106, from which, in response the ASIC 114 provides the image data to the normalization engine 118 generating affected image data that is then transmitted to the host process 124 for image processing.

As mentioned, the near field image sensor 104 and the far field image sensor 106 capture image data over different respective fields of view (FOV), e.g., the former capturing over a range of less than 44 inches distance from a scanner device and the later capturing over a range of greater than 8 inches from the scanner device. That is, in some examples, these operative ranges of image sensors overlap, while in other examples they do not. In an example, the near field image sensor 104 captures image data at an image size of a 1 MP (e.g., having 1280×800 pixels) and the far field image sensor 106 captures image data at a larger size of 2 MP (e.g., 1920×1080 pixels). While not required, generally the far field image sensor 106 with have a smaller FOV (e.g., 14° FOV), as measured in angle of divergence, compared to the larger FOV (e.g., 40° FOV) of the near field imager sensor 104. Yet, objects, features, barcodes, etc. will be smaller in the far field compared to the near field, and, as such, generally the far field image sensor will have a higher resolution, and thus large image size, to maintain accurate analysis of the image data when eventually provided to the host processor 124.

The two sensors 104, 106 can be separate structures mounted on the same printed circuit board. In other examples, the two sensors 104, 106 may be integrated into a single photodiode array structure, with each sensor partitioned to a different portion of the array structure. In operation, in some examples the image sensor controller 120 controls the sensors 104, 106 to capture image data at the response image sizes at a sample frame rate, e.g., 60 frames per second (fps). In some examples, the respective frame rates of the sensors 104, 106 differ from one another. Further, captured image data from each sensor 104, 106 is sent to the ASIC 114. In some examples, the ASIC 114 buffers the entire capture image data, for example, each frame. In some examples, the ASIC 114 receives the image data using only row buffering, thereby reducing the buffer memory size on the ASIC 114.

While image sizes are determined by the differences in pixel size, the speed of image capture and communication is also determined by the type of I/O interfaces 122 and 126 and the type of buses 108a/108b and 116. In various examples, the interfaces 122, 126 are each mobile industry processor interface (MIPI) I/O interfaces, and the buses 108a/108b and 116 are MIPI buses. Other example bus architectures include parallel bus, serial peripheral interface (SPI), high speed serial peripheral interface (HiSPi), low voltage differential signaling (LVDS), and universal serial bus (USB). In some examples, in addition to the connection between interfaces 122 and 126 for affecting data transfer, the front-end 110 and the back-end 112 may be connected together by control interfaces, such as an $I^2C$ command/control interface or a Camera Control Interface (CCI). As such, in some examples, the interfaces 122 and 126 may represent a control and data interface. Each of the buses 108a, 108b, and 116 may be a single pipe bus (i.e., a single lane), while in other examples, the buses 108a/108B and 116 are dual pipe (i.e., two lane) bus. For MIPI compliant buses and interfaces, a MIPI data rate of 672 Mbps/lane may be used. In some examples, each of the image sensors 104, 106 may use two MIPI lanes (108a and 108b, respectively) at 8 bits/pixel to transmit the respective image data from the sensor. In such examples, the maximum output data rate to the host processor 124 may be 2*672 Mbps=1344 M bps. In some examples, the data channels 108a, 108b have the data throughput rate that is different than the data throughput rate for the data channel between interfaces 122 and 126. In some examples, the channels 108a and 108b are 1 channel, 2 channel, or 4 channel MIPI data channel, and the data channel 116 is a 2 channel or 4 channel MIPI data channel.

In the example of FIG. 1, the back-end 112 includes a local bus 128 providing bi-directional communications between the host processor 124, the I/O interface 126, a memory 130 and a networking interface 132. More generally, the bus 128 may connect the host processor 124 to various sub-systems of the imaging device 100, including a WiFi transceiver subsystem, a near field communication (NFC) sub-system, a Bluetooth sub-system, a display, series of applications (apps) stored in an app memory sub-system, a power supply providing power to the imaging reader 30, and a microphone and speaker sub-system.

To facilitate decoding the different types of image data captured at the respective image sensors 104, 106, the back-end 112 includes the host processor 124 the memory 130 includes imaging applications 134 that include an image data processing application 136. Executing, the image data processing application 136, the host processor 124 receives the image data from the ASIC 114 and provides that image data to the image data processing app 134, as is, or performs initial processing on the received image data, such as determining if there a tag or other metadata in the image data identifying the image sensor source (104 or 106), identifying a type of normalization process performed on the image data by the normalization engine 118 (as further explained herein), or having data that may be used in image processing.

In various embodiments where the imaging device 100 is a barcode scanner imaging device, the imaging app 134 may include one or more apps to more efficiently identify indicia in the image data and decode that indicia to generate decode data corresponding to the indicia. By contrast, in various embodiments where the imaging device 100 is a machine vision device, the imaging apps 134 may include one or more apps to identify one or more objects in the image data, one or more defects in identified objects, the presence or absence of particular objects in the image data, distances between identified objects in the image data, contrast data, brightness data, pixel count, or a combination thereof.

To affect such processes, in various embodiments, the host processor 124 executes the image data processing app 136 to identify one or more barcodes (or other indicia) in the received image data. For example, the image data processing app 136 may be configured to identify and decode identified indicia, whether the indicia are one-dimensional (1D) or two-dimensional (2D) barcodes, quick response (QR) codes, linear barcodes, or other encoded indicia. The decode barcode data may represent the decoded information encoded in one or more barcodes on objects within the image data, for example. Further, as a part of image data processing, the app 136 may perform pixel and image smoothing on the image data. Additional processing may include statistical analysis on blocks of image data, such as on the pixel groupings, by performing edge detection identifying indicial or other symbols in the image data, including the bounds of the indicia or symbol and the resolution of the indicia or symbol for sufficiently accurate identification of the indicia and symbol and sufficiently accurate decoding of the indicia or identification of the symbol.

The memory 130 may represent one or more memories and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., imaging applications 134 (including 136) and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the host processor 124 (e.g., working in connection with the respective operating system in the memory 130) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The host processor 124 may be connected to the memory 130 through a computer bus, such as bus 128, responsible for transmitting electronic data, data packets, or otherwise electronic signals to and from the host processor 124 and the memory 130 in order to implement or perform the machine readable instructions, methods, processes, elements or limitations, as illustrated, depicted, or described for the various flowcharts, illustrations, diagrams, figures, and/or other disclosure herein. The host processor 124 may interface with the memory 130 via the computer bus 128 to create, read, update, delete, or otherwise access or interact with the data stored in the memory 130 and/or external databases (e.g., a relational database, such as Oracle, DB2, MySQL, or a NoSQL based database, such as MongoDB). The data stored in the memory 130 and/or an external database may include all or part of any of the data or information described herein, including, for example, image data from images captures by the near field image sensor 104 and far field image sensor 106, from the front-end 110, and more specifically from the ASIC 114.

The example processing platform 102 further includes at the back-end 112 the networking interface 132 to enable communication with other imaging devices (e.g., barcode imaging devices or machine vision devices) via, for example, one or more networks. The example networking interface 132 includes any suitable type of communication interface(s) (e.g., wired and/or wireless interfaces) configured to operate in accordance with any suitable protocol(s) (e.g., Ethernet for wired communications and/or IEEE 802.11 for wireless communications and/or USB3.0). The example processing platform 100 also includes the I/O interface 126, which in some examples represents multiple I/O interfaces, such as a MIPI interface for physically connecting to the front-end 110 through its MIPI I/O interface 122, and another I/O interface to enable receipt of user input and communication of output data to the user, for example, device interfaces may be external I/O interfaces of the back-end 112 to allow for physical connection to external peripherals separate from the connection between I/O interfaces 122 and 126. Such user input and communication may include, for example, any number of keyboards, mice, USB drives, optical drives, screens, touchscreens, etc. The front-end 110 and the back-end 112, which are communicatively coupled, may also be physically, removably coupled to one another via a suitable interface types. The I/O interfaces 122 and 126 may generally be any high-speed data interface, such as MIPI, HiSPi, or LVDS. The I/O interfaces 122 and 126 may be consider to form an image data interface or a frame interface. In some examples, a Camera Serial Interface is used. Furthermore, although shown separately, the interface 126 may be integrated into the host processor 124 or separately connected thereto. For example, the image data from the front-end 110 may be received directly to the interface 126 along with a direct memory access (DMA). Indeed, the memory 130 and/or the networking interface 132 may be integrated into the host processor 124. Thus, in various examples of the back-end 112, there is no local bus 128 or separate I/O interface 126, but rather communication occurs directly to the host processer 124 circuit which provides the functions described through integrated modules.

Figure 2:
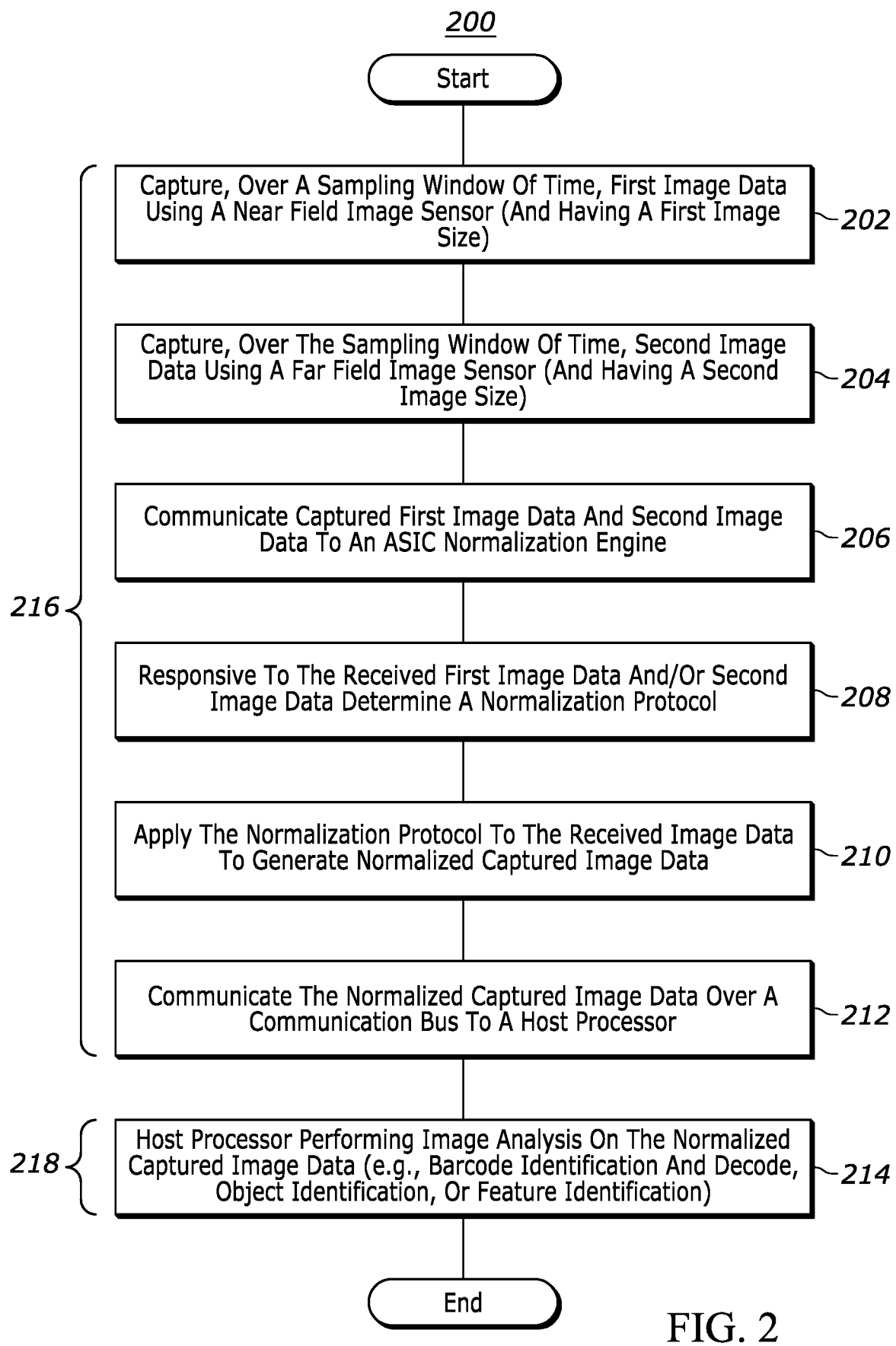
FIG. 2 illustrates a flowchart representative of a method for providing a host processor with image data from the two imaging sensors in FIG. 1 including a normalization process at the ASIC, in accordance with embodiments described herein.

FIG. 2 is a flowchart representative of a method 200 for providing a host processor image data from multiple different imaging sensors, in accordance with embodiments described herein. Generally, and as mentioned above, the method 200 for providing image data includes capturing image data, affecting that image data through a normalization process at a front-end processor to normalize the image data irrespective of which imaging sensor source captured the image data. Once normalized at the front-end, the affected image data is sent to a host process at a back-end for processing. That is, the method 200 provides a method for sending image data originally of different sizes to a host to perform barcode decoding, object identification, feature identification, etc., where the size of the image data has been normalized to be equal irrespective of imager source, thereby removing the need to dynamically re-program a host processor.

In the illustrated example, the imaging device, such as imaging device 100, captures various images (captured as image data) over a sampling window of time. That image data is captured at block 202 by the near field image sensor (e.g., image sensor 104) and at block 204 by the far field image sensor (e.g., image sensor 106), resulting in image data captured at different ranges, over different FOVs, and at different resolutions and image sizes. The blocks 202 and 204 are shown separately for illustrative purposes. The imaging device 100 may be configured to continuously capture frames of image data over a respective FOV, e.g. at 60 fps for each image sensor. The imaging device 100, unlike cellular phone type dual imaging device, is able to automatically capture image data from either or both of the image sensors over a sampling window of time. For example, the imaging device 100 may capture images from each sensor in alternating frames, and perform initial processing of such images, e.g., at the ASIC 114 to determine if objects in an image are better imaging by the near field image sensor or the far field image sensor, for example, by determining a sharpness and assigning the image sensor capturing the sharpest image and the image sensor to capture a series of image data for sending to the host processor 124 for analysis. In such examples, image data may be captured at only one of the blocks 202 and 204, over the sampling window. In another examples, image data is captured at each block 202 and 204.

Which image data is captured, that image data is communicated to the ASIC 114 and more particularly to the normalization engine 118, at block 206, and responsive to the received image data, a normalization protocol is identified at a block 208. In various examples, the normalization protocol to be applied depends on characteristics of the received image data, such as the source image sensor, the type of image sensor (near field or far field), the pixel resolution of the image sensor, and the image size of the image data. As discussed further below, in some examples the constraints are back-end and/or host processor constraints. In an example implementation of block 208, the ASIC 114 analyzes the received image data to determine the characteristic(s) to be used in identifying a normalization protocol. In other examples, the ASIC 114 may identify the characteristics based on the a priori knowledge of which image sensor is connected to which MIPI line pair. In various examples where image data is received from bock blocks 202 and 204, the block 208 may determine characteristics of each image data to identify a normalization protocol. In some examples, the normalization protocol may be pre-determined at the block 208. That is, the block 208 may be pre-configured to apply a particular normalization protocol.

At a block 210, the identified normalization protocol is applied to one or both of the image data received. The normalization protocols include protocols to force the image data received at the host processor to have the same image size irrespective of source imager sensor. In some examples, the normalization protocols force the image data to additionally have the same frame rate irrespective of source image sensor. In some examples, normalization is performed to ensure that the frame rates of the image data to the host processor are within +/−10%, +/−5%, or +/−1% of the captured frame rates out of the source image sensor. In other examples, the normalization protocols force the image data to have the same aspect ratio. As detailed further, in some examples a normalization protocol performs padding on the rows and/or columns of the lower resolution image to equal the resolution and aspect ratio (i.e., same number of rows and columns) of the higher resolution (and larger size) image. In some examples, the normalization protocol performs padding on the smaller size image increase the size to that of the larger image but with a different aspect ratio. Regardless of the source sensor, the image data to the host processor has the same number of pixels. With such examples, the normalization protocol can achieve a higher frame rate for the smaller image sensor, so long as the host processor is able to accept images of the same number of pixels but with different aspect ratios. Another normalization protocol includes applying multiple scaling/padding settings to reduce the size of the larger image data to match the size of the smaller image data (e.g., to have same number of rows and columns). An advantage of this protocol is the ability to have higher frame rates and lower data rates to the host processor. However, this protocol may further include the ASIC choosing and sending multiple versions of the lager image data to the host processor. For example, the normalization protocol may create and send a binned version of the higher resolution sensor for full FOV at lower resolution and a cropped version for higher resolution at a smaller FOV.

After the received image data is applied to the normalization process, at a block 212, the ASIC 114 sends the image data to the host processor 124 for processing, at a block 214. In various examples, the processes of claims 202-212 are performed at a front-end 216 of an imaging device (such as front-end 110 of the processing platform 102) and the process of block 214 is performed at a back-end 218 of the imaging device (such as the back-end 112).

Figure 3:
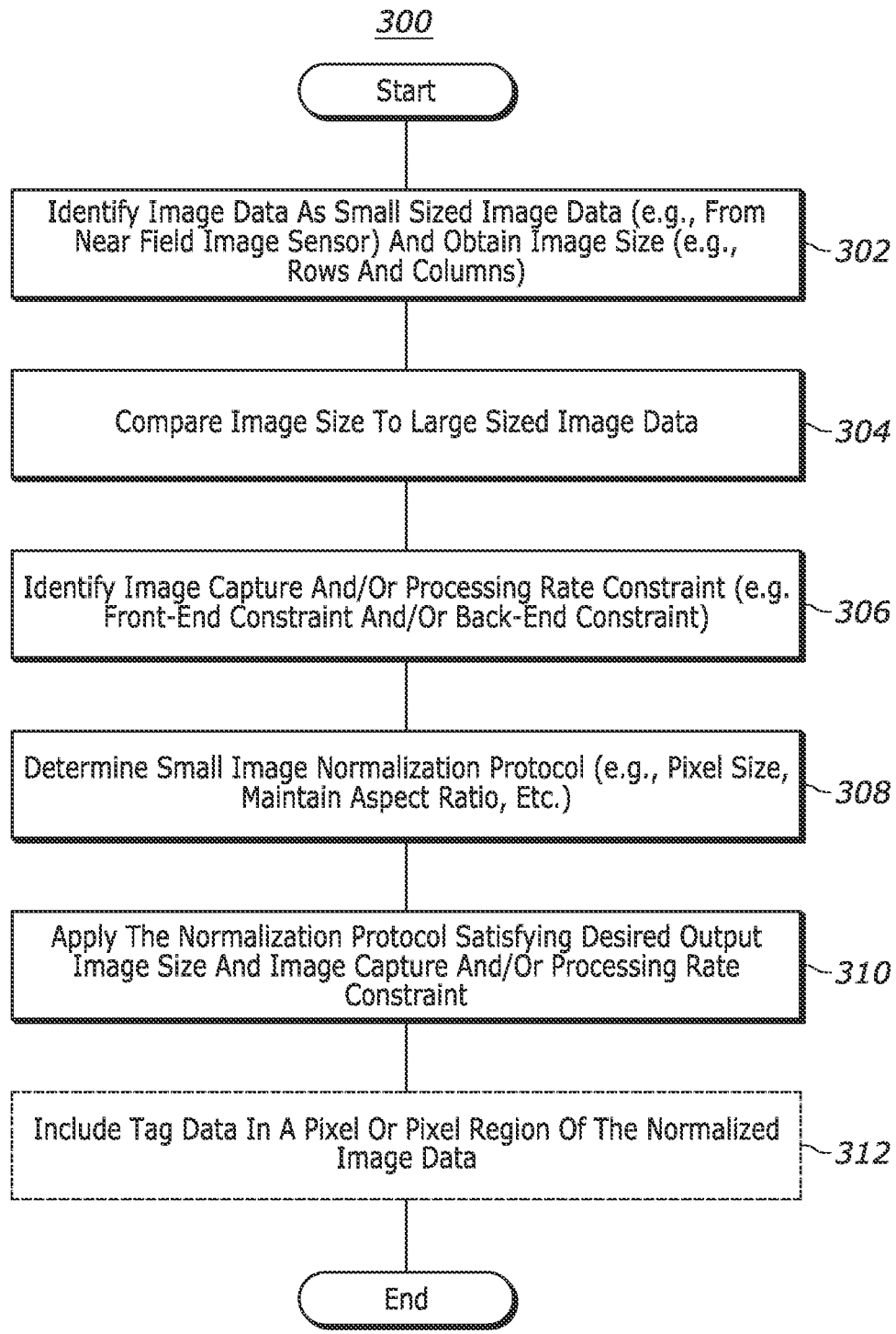
FIG. 3 illustrates a flowchart representative of a method for normalizing image data captured from a near field image sensor of imaging device in FIG. 1 and as may be performed by the method of FIG. 2, in accordance with embodiments described herein.

FIG. 3 is a flowchart representation of a method 300 as may be performed by the blocks 208 and 210 of FIG. 2 and the normalization engine 118 of FIG. 1. More particularly, the method 300 is an example normalization protocol performed on a smaller size image data, such as that captured by the near field image sensor 104. At a block 302, the method 300 identifies received image data as smaller sized image data (e.g., from near field image sensor 104) and determines the row and column sizes of that image data. At a block 304, the determined size values are compared to those of the received larger sized image data (e.g., from the far field image sensor 106) to determine the difference in size, that difference being used, in part, to determine the normalization protocol. At a block 306, rate constraint data is identified for use, along with image size data, to determine a normalization protocol. Example rate constraint data includes a desired frame rate per second of the captured image data at the front-end to the ASIC, a desired frame rate per second output to the back-end host processor, or other rate constraint. Another example rate constraint data is the rate of image processing at the ASIC and/or host processor. The rate of image processing may be the processing speed the ASIC and/or host processor uses to process a row of pixels in an image data, for example.

Based on the comparison on the size data and comparison data of blocks 302 and 304 and the rate constraint data of block 306, at a block 308 a normalization protocol is determined, and that normalization protocol is applied at a block 310. Optionally, at a block 312, the ASIC 114 may add tag data to one or both of the captured image data, whether the image data has been normalized or not. Such tag data may indicate the type of source image sensor (e.g., near field or far field) or a code indicating the type of normalization process performed at the ASIC 114. The host processor 124 may then strip the tag data, analyze it, and use it to configure its image processing.

Figure 4:
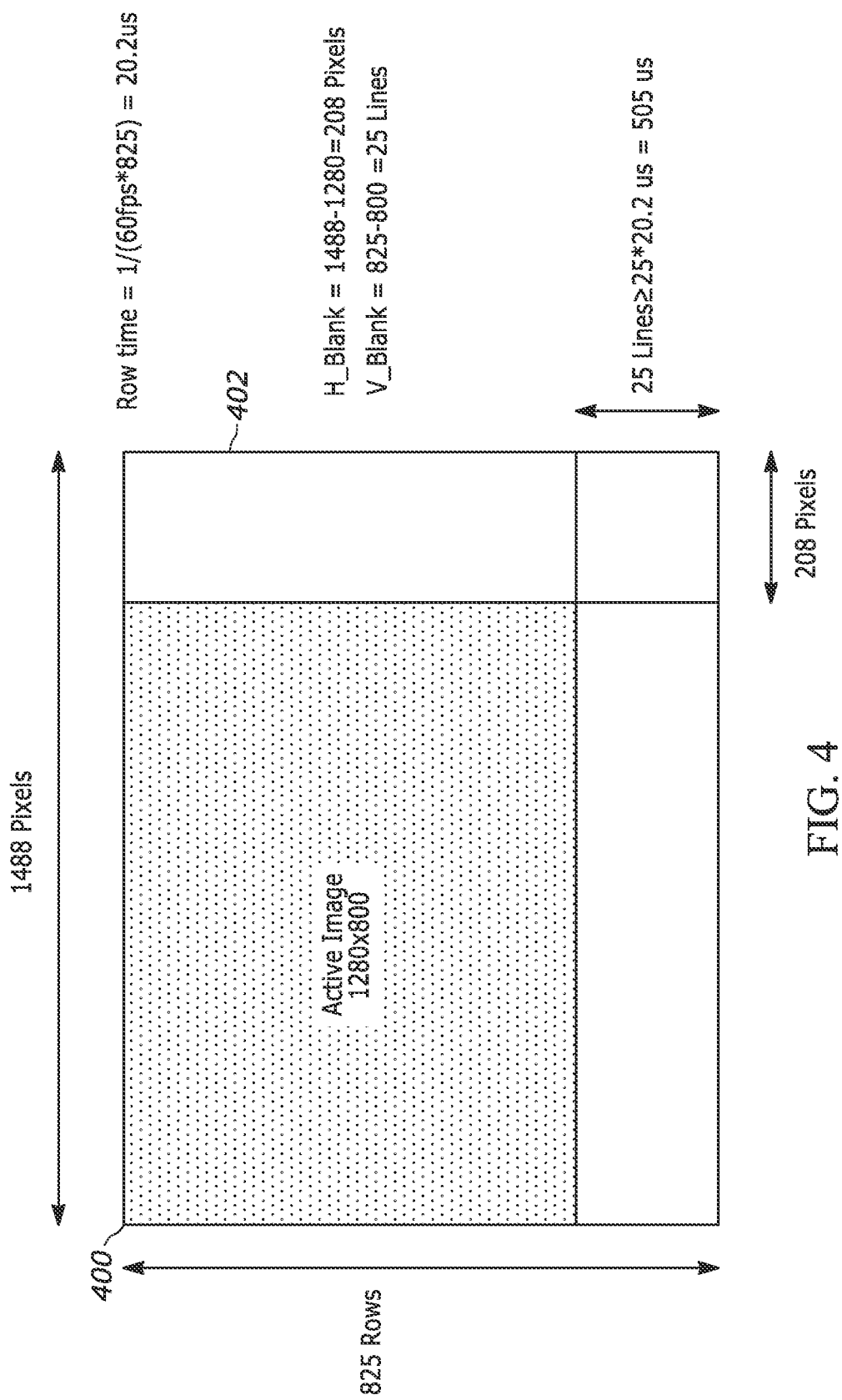
FIGS. 4 and 5 illustrate a padding process applied to normalize image data from a near field image sensor image, in accordance with embodiments described herein.
Figure 5:
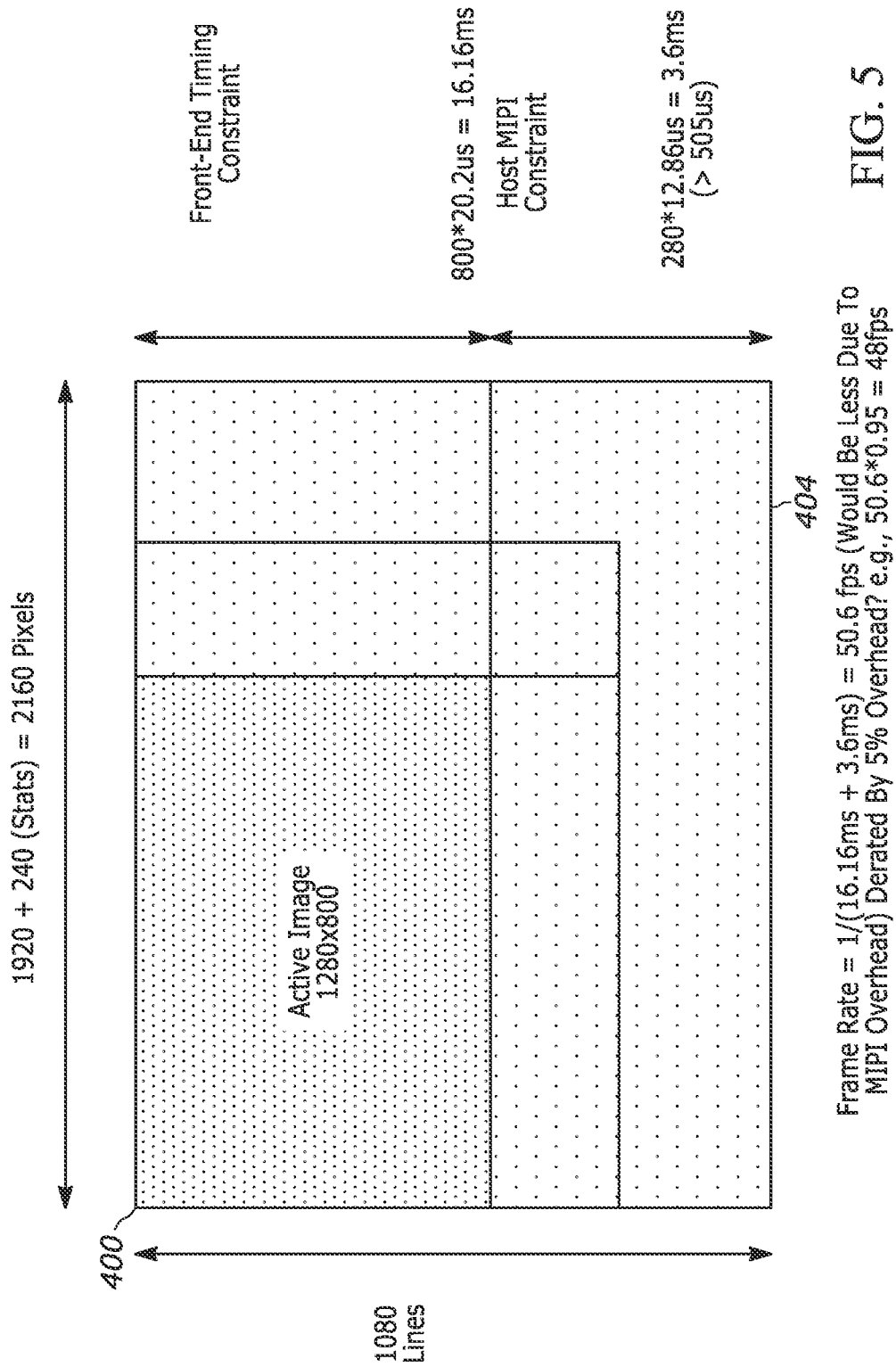

FIGS. 4 and 5 illustrate an example process of determining padding to increase the size of the smaller image data to thereby normalize the image data to a large size for handing at a host processor. FIG. 4 illustrates an example image data 400 captured by a near field imager sensor 104. The image data 400 has an image pixel size of 1280×800 pixels (1 MP) and is captured at a rate of 60 frames per second from the image sensor 104 to the ASIC 114. We consider whether padding to a larger pixel size image data 402 could be used while still satisfying the 60 fps goal objective. To maintain the 60 fps image captured rate constraint, we examined an example normalized image pixel size of 1488×825 pixels, which would add 208 additional columns of pixels and an 25 lines of pixels, where the additional lines of pixels would addition an additional 505 μs of transmit time from the imager sensor to the ASIC, in this example. To further assess the effect of padding of the image data 400, FIG. 5 illustrates the time constraint effects of an even larger padded image from the ASIC 114 to the host processor 124, more specifically, padding the image data 400 to have the same pixel size (rows and columns) as a 2 MP far field image sensor captured image data. In the illustrated example, a normalized image data 404 is shown having pixel size 2160×1080. Based on the determination shown in FIG. 4, to maintain a 60 fps rate constraint of the captured image data, the additional 280 rows for the normalized image data 404 would have to be communicated to the host processor in 505 μs additional transmit time. Considering the bus data rates, which for each MIPI lane is 672 Mbps/lane, and assuming two MIPI lines per bus and a pixel size of 8 bits/pixel, the maximum output data rate to the host processor is 2*672 Mbps=1344 Mbps. The fastest time to output a row is 1920+240=2160 pixels)=2160*8 bit/1344 Mbps=12.86 is. Therefore, as shown in FIG. 5, a time constraint for the 800 rows of active image data 400 results in 16.16 ms of processing, at the front-end 110, and a time constraint for the additional 280 rows of 3.6 ms to the host processor 124, i.e., from the front-end 110 to the back-end 112. Because that 3.6 ms is greater than the limit of 505 is, the 60 fps rate constraint at the front-end 110 is not met to the host processor 124. Instead, at the host processor a 50.6 fps would be applied, and considering an overhead value for the bus (approx. 5% overhead for a MIPI bus, for example), the host processor 124 would see a normalized (padded) image data at 48 fps, in this example. The block 310 therefore could apply a normalization that increases the image data 400 to a padded image data 404, and satisfy a front-end fps rate constraint (e.g., 60 fps on received images to the ASIC) and a satisfy a back-end fps rate constraint (e.g., a minimum 30 fps to the host processor 124 or a maximum of 60 fps to the host processor). The increased rows and columns would be blank pixel data, for example.

Other ways the normalization process of block 310 can satisfy a rate constraint is by having the ASIC not send every frame of image data to the host processor, but rather skip one or more frames between sending the image data. In that way, a 60 fps image data received to the ASIC can be reduced to approximately 30 fps to the host processor, by not processing and sending every other frame of image data. Image data not sent may still be processed at the front-end 110 to improve image quality for the next image data that is sent, for example, to determine auto exposure, focus, etc. parameters used for subsequent frame image data capture.

The normalization process of block 310 can normalize the image data, such that the same number of pixels are contained in the near field image data as in the far field image data. For example, a 2MP for field image data may contain 2160×1080=2,332,800 pixels and a normalized near field image data can be padded to contain 2916×800=2,332,800 pixels (and thus also have 2 MP in size). The, the normalization process of block 310 can send to the host processor image data with the same number of pixels, but with different aspect ratios, without the host processor needing to change acquisition settings. In some examples, the normalization process of block 310 may scramble (not pad) the fair image data by sending it at 2916×800 pixels to match the X and Y aspect ratio of the near field image sensor, where one input row of the image data would space more than one output row of the normalized image data. The host processor, in such situations may be configured to properly unscramble the received normalized image for proper reading of the row size. And thus as described, in some examples, the block 310 may be configured to affect both the near field image data and the far field image data, to affect only the near field image data, or to affect only the far field image data based on an assessment of the near field image data. In some examples, normalization can also be performed to match a host processor capability constraints. For example, a host processor may not have capability to handle higher frame rate or higher resolution. Oher constraints imposed by the back-end itself and/or host processor specifically, include constraints such as fps supported, resolution supported, whether image data needs to be flipped due to front-end mounting orientation relative to the back-end. Therefore, in some examples, the host processor constraint is identified, for example, in place of or in addition to the rate constraint of block 306.

Figure 6:
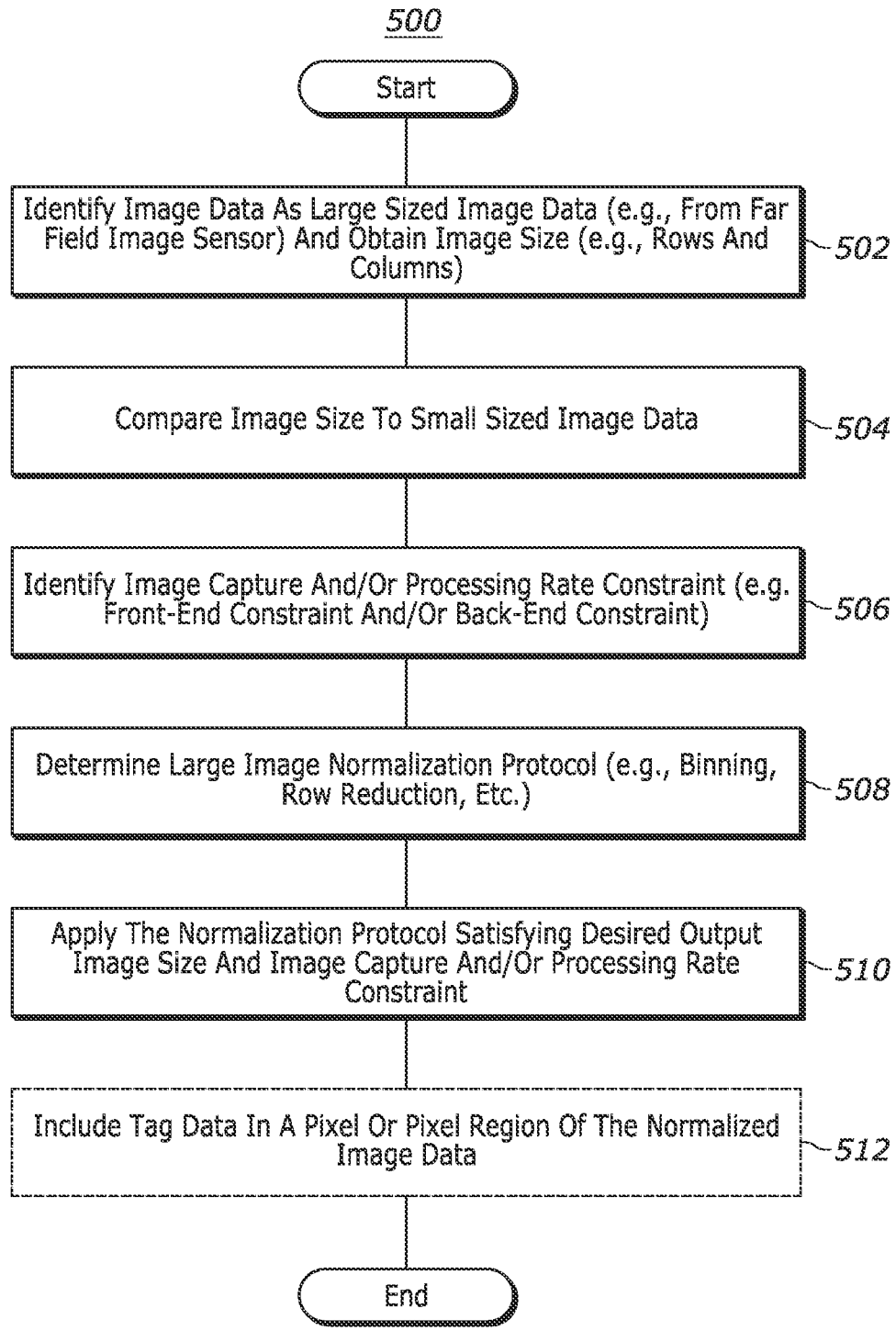
FIG. 6 illustrates a flowchart representative of a method for normalizing image data captured from a far field image sensor of imaging device in FIG. 1 and as may be performed by the method of FIG. 2, in accordance with embodiments described herein.

FIG. 6 is a flowchart representation of another example method that as may be performed by the blocks 208 and 210 of FIG. 2 and the normalization engine 118 of FIG. 1. More particularly, a method 500 is an example normalization protocol performed on a larger size image data, such as that captured by the far field image sensor 106. At a block 502, the method 400 identifies received image data as a larger sized image data (e.g., from far field image sensor 106) and determines the row and column sizes of that image data. At a block 504, the determined size values are compared to those of the received smaller sized image data (e.g., from the near field image sensor 106) to determine the difference in size, that difference being used, in part, to determine the normalization protocol. At a block 506, rate constraint data is identified for use, along with image size data, to determine a normalization protocol. Example rate constraint data includes a desired frame rate per second of the captured image data at the front-end to the ASIC, a desired frame rate per second output to the back-end host processor, or other rate constraint. Another example rate constraint data is the rate of image processing at the ASIC and/or host processor. The rate of image processing may be the processing speed the ASIC and/or host processor uses to process a row of pixels in an image data, for example.

Based on the comparison on the size data and comparison data of blocks 502 and 504 and the rate constraint data of block 506, at a block 508 a normalization protocol is determined, and that normalization protocol is applied at a block 510. Similar to block 312, an optional block 512 may add tag data to one or both of the captured image data, whether the image data has been normalized or not. As with the block 312, the tag data may be a code indicating the type of normalization process performed at the ASIC 114. The tag data may indicate whether illumination/flash was used during exposure, the brightness level of the image, a frame identification code such as frame count, whether special illumination sequences (different LED lights) were utilized, etc. While the tag data is shown optionally included in the image data after normalization, in some examples the tag data may be introduced before normalization, e.g., before padding.

The normalization protocols of block 508 differ from those of block 308 in that they are generally directed to reducing the size the large image data or reducing the frame rate of that image data to match that of the smaller image data frame rate. Example normalizations that may be performed at the block 508 include, the normalization engine 118 splitting the large image data into two or more different scaled images. For example, a 2 MP image can be split into two 1 MP images, each sent over a different MIPI lane of the bus. In some examples, at the block 520, the normalization engine 118 may simply crop the large image data to match the size of the small image data. In some examples, the normalization engine 118 may applying a binning process to the larger image data. Yet, in further examples of the block 510, the normalization engine 118 may apply an image scaler that changes the size of the image by a non-integer value, which can be a more flexible approach that cropping or binning. For example, a 1 MP cropped central region of the larger image data by identified as a full pixel resolution (1280×800) to match that of the smaller image data. Or 1 MP at the full FOV may be determined but with a reduced pixel resolution of 1280×720. Various other image scalers may be applied. In some examples, the normalization engine 118 may reduce the active rows, the active columns, or both of the large image data. It is noted, that depending on the application, normalization protocols described in reference to block 508 may be performed on the other image data at block 308, or vice versa, and resolution a normalized pair of image data from the respective different image sensors. In some examples, only part of the normalization protocol of block 508 (or block 308) is performed on its input image and a remaining part of the normalization protocol may be performed by the other block on its input image.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for providing host processor processing of image data from imaging sensors, the method comprising:
   capturing image data of a near field of view of an environment using one of the imaging sensors, the image data of the near field of view being captured at a first image size;
   capturing image data of a far field of view of the environment from another of the imaging sensors, the image data of the far field of view being captured at a second image size different that the first image size;
   communicating the captured image data of the near field of view and the captured image data of the far field view to a normalization engine;
   at the normalization engine, performing an image normalization process on at least one of the captured image data of the near field of view and the captured image data of the far field view to normalize at least one of the first image size and the second image size prior to communicating at least one of the captured image data of the near field of view and the captured image data of the far field view to an external host processor coupled to the normalization engine through a communication interface; and
   at the host processor, performing an image processing on at least one of the captured image data of the near field of view and the captured image data of the far field view,
   wherein performing the image processing comprises decoding a decodable indicia in at least one of the captured image data of the near field of view and the captured image data of the far field view.

2. The method of claim 1, wherein the first image size is smaller than the second image size, and wherein performing the image normalization process on at least one of the captured image data of the near field of view and the captured image data of the far field view comprises:
   applying a padding process to the captured image data of the near field of view to increase the first image size to equal that of the second image size.

3. The method of claim 1, wherein the first image size is smaller than the second image size, and wherein performing the image normalization process on at least one of the captured image data of the near field of view and the captured image data of the far field view comprises:
   applying a cropping process to the captured image data of the far field of view to decrease the second image size to equal that of the first image size.

4. The method of claim 1, wherein the first image size is smaller than the second image size, and wherein performing the image normalization process on at least one of the captured image data of the near field of view and the captured image data of the far field view comprises:
   applying a binning process to the captured image data of the far field of view to decrease the second image size to equal that of the first image size.

5. The method of claim 1, wherein the first image size is smaller than the second image size, and wherein performing the image normalization process on at least one of the captured image data of the near field of view and the captured image data of the far field view comprises:
   applying a scaling process to the captured image data of the far field of view to decrease the second image size to equal that of the first image size.

6. The method of claim 1, wherein the first image size is smaller than the second image size, and wherein performing the image normalization process on at least one of the captured image data of the near field of view and the captured image data of the far field view comprises:
   altering an aspect ratio of one or both of the captured image data of the far field of view and the captured image data of the near field of view so that the second image size is equal that of the first image size.

7. The method of claim 1, wherein performing the image normalization process comprises:
   reducing a number of active rows in one or both of the captured image data of the far field of view and the captured image data of the near field of view so that the second image size is equal that of the first image size.

8. The method of claim 1, wherein performing the image normalization process results in an equal number of pixels in the first image size and the second image size.

9. The method of claim 1, wherein performing the image normalization process comprises:
   altering the first image size and/or the second image size until the captured image data of the near field of view and the captured image data of the far field view are sent from the normalization engine to the host processor at substantially the same frame rate.

10. The method of claim 9, where substantially the same frame rate comprises a frame rate of the captured image data of the near field of view within +/−10% of a frame rate of the captured image data of the far field view.

11. The method of claim 1, wherein performing the image normalization process comprises:
    altering a frame rate of the image data of the near field of view and/or a frame rate of the image data of the far field of view before communicating to the host processor.

12. The method of claim 1, further comprising adding tag data one or both of the captured image data of the far field of view and the captured image data of the near field of view, the tag data indicating a type of the image normalization process or a source imaging sensor for the one or both of the first image data and the second image data.

13. The method of claim 1, wherein a near field image sensor captures the image data of the near field of view and a far field image sensor captures the image data of the far field of view, and wherein the near field image sensor and the far field image sensor are coupled to the normalization engine by respective data channels each having a same data throughput rate, and wherein the normalization engine is coupled to the host processor through a separate data channel having the same data throughput rate or a different data throughput rate.

14. The method of claim 1, wherein the near field image sensor and the far field image sensor are coupled to the normalization engine through a 1 channel, 2 channel, or 4 channel MIPI data channel, respectively.

15. The method of claim 1, wherein the normalization engine is coupled to the host processor through a 2 channel or 4 channel MIPI data channel.

16. An image sensor comprising:
    a front-end terminated in a communication interface configured for communicating with an external host processor through the communication interface;
    the front-end comprising,
    an image sensor assembly comprising, a near field of view image sensor configured to capture a first image data at a first image size, and a far field of view image sensor configured to capture second image data at a second image size different than the first image size, and a normalization engine configured to receive the first image data and the second image data and further configured to perform an image normalization process on at least one of the first image data and the second image data to normalize at least one of the first image size and the second image to generate a normalized image data set for communicating to the host processor, the normalization engine coupled to communication interface, wherein the normalization engine is configured to alter the first image size and/or the second image size until the first image data and the second image data are to have substantially the same frame rate over the communication interface.

17. The image sensor of claim 16, further comprising the external host processor coupled to the communication interface, the host processor configured to performing an image processing on the normalized image data.

18. The image sensor of claim 16, wherein the normalization engine is configured to:
apply a padding process to the first image data to increase the first image size to equal that of the second image size.

19. The image sensor of claim 16, wherein the normalization engine is configured to:
apply a cropping process to the second image data to decrease the second image size to equal that of the first image size.

20. The image sensor of claim 16, wherein the normalization engine is configured to:
apply a binning process to the second image data to decrease the second image size to equal that of the first image size.

21. The image sensor of claim 16, wherein the normalization engine is configured to:
apply a scaling process to the second image data to decrease the second image size to equal that of the first image size.

22. The image sensor of claim 16, wherein the normalization engine is configured to:
alter an aspect ratio of one or both of the first image data and the second image data so that the second image size is equal that of the first image size.

23. The image sensor of claim 16, wherein the normalization engine is configured to:
reduce a number of active rows in one or both of the first image data and the image data so that the second image size is equal that of the first image size.

24. The image sensor of claim 16, wherein the normalization engine is configured to:
equalize a number of pixels in the first image size to a number of pixels in the second image size.

25. The image sensor of claim 16, where substantially the same frame rate comprises a frame rate of the first image data being within +/−10% of a frame rate of the second image data.

26. The image sensor of claim 16, wherein the normalization engine is configured to:
alter a frame rate of the first image data and/or a frame rate of the second image data.

27. The image sensor of claim 16, wherein the normalization engine is configured to:
add tag data to one or both of the first image data and the second image data, the tag data indicating a type of the image normalization process or a source imaging sensor for the one or both of the first image data and the second image data.

28. The image sensor of claim 16, further comprising:
the near field of view image sensor being coupled to the normalization engine through a first data channel and the far field of view image sensor being coupled to the normalization engine through a second data channel, the first data channel and the second data channel having a same data throughput rate, and wherein the communication interface for communicating with the external host processor provides a separate data channel having the same data throughput rate as the first data channel and the second data channel or a different data throughput rate.

29. The image sensor of claim 28, wherein the first data channel and the second data channel are each a 1 channel, 2 channel, or 4 channel MIPI data channel.

30. The image sensor of claim 28, wherein the separate data channel provided by the communication interface is a 2 channel or 4 channel MIPI data channel.

* * * * *